(12) United States Patent
Catarain Arregui

(10) Patent No.: US 6,234,071 B1
(45) Date of Patent: May 22, 2001

(54) AUTOMATIC MACHINE FOR DISPENSING NATURAL JUICES

(76) Inventor: Esteban Catarain Arregui, Ugaldetxo, 2 - 4°, 20180 Oyarzun (Guipúzcoa) (ES)

( * ) Notice: Subject to any disclaimer, the term of this patent is extended or adjusted under 35 U.S.C. 154(b) by 0 days.

(21) Appl. No.: 09/446,593

(22) PCT Filed: Jun. 26, 1998

(86) PCT No.: PCT/ES98/00186

§ 371 Date: Dec. 21, 1999

§ 102(e) Date: Dec. 21, 1999

(87) PCT Pub. No.: WO99/00024

PCT Pub. Date: Jan. 7, 1999

(30) Foreign Application Priority Data

Jun. 26, 1997 (ES) .................................................. P9701407

(51) Int. Cl.[7] .............................. A23N 1/00; B30B 9/02; G07F 13/00
(52) U.S. Cl. ................... 99/504; 99/501; 99/507
(58) Field of Search ............................. 99/495, 501–513, 99/349; 100/98 R, 108, 213, 215, 218, 125, 245; 221/258, 251, 170, 174

(56) References Cited

U.S. PATENT DOCUMENTS

| | | | | |
|---|---|---|---|---|
| 4,896,591 | * | 1/1990 | Bertrand | 99/507 |
| 4,905,586 | * | 3/1990 | Anderson et al. | 99/510 |
| 4,917,007 | * | 4/1990 | Nelson | 99/509 |
| 4,922,814 | * | 5/1990 | Anderson et al. | 99/510 |
| 5,249,516 | * | 10/1993 | Pastor | 99/504 |
| 5,339,729 | * | 8/1994 | Anderson | 99/509 |
| 5,671,663 | * | 9/1997 | Alvarez Fernandez | 99/489 |

* cited by examiner

*Primary Examiner*—Timothy F. Simone
(74) *Attorney, Agent, or Firm*—Bierman, Muserlian and Lucas

(57) ABSTRACT

The automatic machine intended to dispense natural juices, has a functional assembly with a supply system with unit dosing of the fruit (7) from a supply hopper, and a pressing system which has a chopping-cutting mechanism (19). The presser-squeezer itself being formed by a rotary head included in a collector (25). The assembly has a residue removal system with a crusher (30) and an expulsion outlet (33). There is also an automatic cleaning system which has a water distribution system (36) with projection outlets at various points.

11 Claims, 9 Drawing Sheets

AUTOMATIC MACHINE FOR DISPENSING NATURAL JUICES

BACKGROUND OF THE INVENTION

For their satisfying refreshment quality, fruit juices are widely consumed products with a constantly growing demand, natural juices standing out in this sense, and particularly those of squeezable fruits, such as orange, lemon, grapefruit, etc., due to the vitamin-rich properties they offer.

Now, owing to the rapid deterioration to which some of the qualities of said juices are subject, it is advisable to prepare them just at the time they are going to be consumed, in order to take effective advantage of all their properties.

To carry out squeezing directed at the preparation of juices, a variety of hand tools or electrically operated hand-held tools has been developed, the greatest progress having been made with automatic machines for obtaining juices by simple activation on demand, without the need for an operator's intervention for preparation.

The machines developed for that purpose present, however, certain defects and problems, related to an excessive functional complexity, as reflected in costs and breakdowns, and even in product quality, with the additional disadvantage in some cases of mishandling of the fruits, which causes some of the qualities, like taste, color, etc., to be affected.

In general, said machines further require manual cleaning, since either they do not provide for automatic cleaning or such cleaning is defective or inadequate, so that, given the fuss and bother and tediousness involved in cleaning on each use, thorough cleaning is only occasionally carried out, the machines meanwhile working with residues accumulated in them, which obviously adversely affects the quality of the product prepared.

SUMMARY OF THE INVENTION

Considering all those disadvantages and the advisability of eliminating them, the present invention proposes a new automatic machine for dispensing squeezed fruit juices, which has been developed with structural and functional characteristics that make them operatively highly advantageous, compared to the machines and appliances previously existing for that function.

This machine, object of the invention, consists basically of a set of mechanisms that are included in a refrigerated space inside an enclosure or frame, comprising an automatic cleaning system, formed by a pressurized water circuit that empties into projection injectors located in each and every one of the functional parts of product treatment.

The functional assembly includes a feed system formed by a loading hopper and a fruit unit proportioning separator, a squeezing system, formed by a fruit slicer and a juice extractor, a residue elimination system, formed by a crusher and an expulsion outlet with hydropneumatic system, and the integrated cleaning system, everything being controlled by a programmable electronic device.

A simple structural and functional assembly is thereby obtained, capable of developing by itself the whole process of preparation and dispensing of juices from a majority load of fruits in the supply hopper, eliminating the resulting residues of each operation and with the accomplishment each time of total cleaning of all parts in contact with the product, residues from other previous processes that might in any way affect the juice in process being completed avoided.

Since the functional assembly is included in a refrigerated space inside a closed frame, the juices that the machine dispenses directly turn out to be cold, furthermore, in optimal condition for consumption, without the need to have to adjust their temperature with ice or other means of cooling and, in any case, without having to add preservatives to the product, since it is directly dispensed for consumption after preparation.

The integrated machine unit, with the said functional assembly enclosed within a frame, makes possible, on the other hand, a connection to a water supply system and to a drain pipe, and also an independent operating arrangement, including within the frame enclosure a water tank and a residue collection container, which affords the possibility of installation of the machine anywhere, even as a self-service machine, without the need for fittings for said purpose.

Therefore, this machine, object of the invention, is a result certainly of some highly advantageous features, which give it a life of its own and a character preferable to that of the devices hitherto used for the same function of preparing juices from squeezable fruits.

DESCRIPTION OF PREFERRED EMBODIMENT(S)

The object of the invention is a machine designed to make and dispense juices of squeezable fruits, such as orange, lemon, grapefruit, etc., by means of a totally automatic operation, without the need for an operator's intervention other than to load the fruits to be squeezed.

Figure 1:
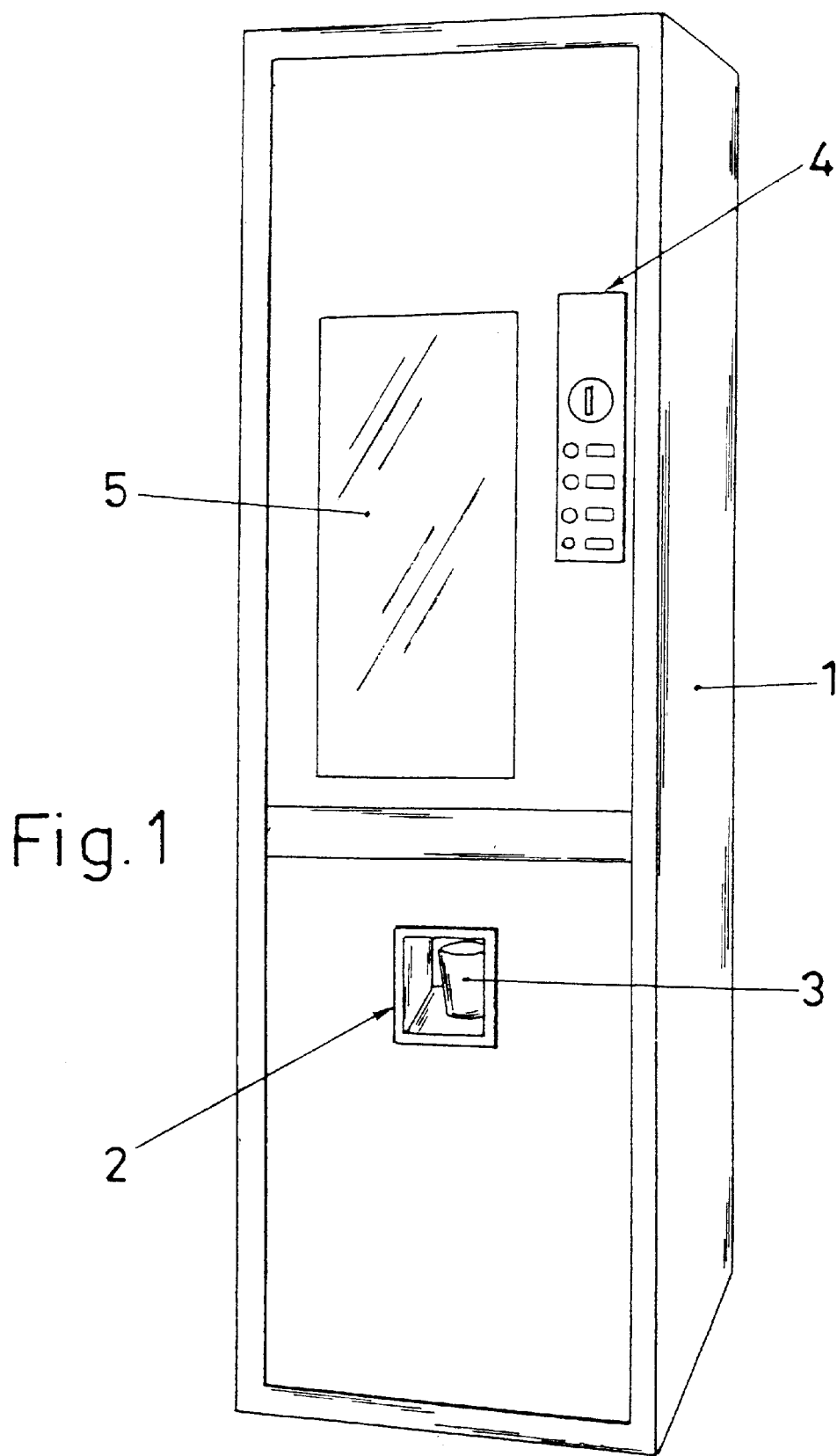
FIG. 1 represents an exterior perspective of the machine recommended, according to a nonlimitative example of the corresponding frame.
Figure 2:
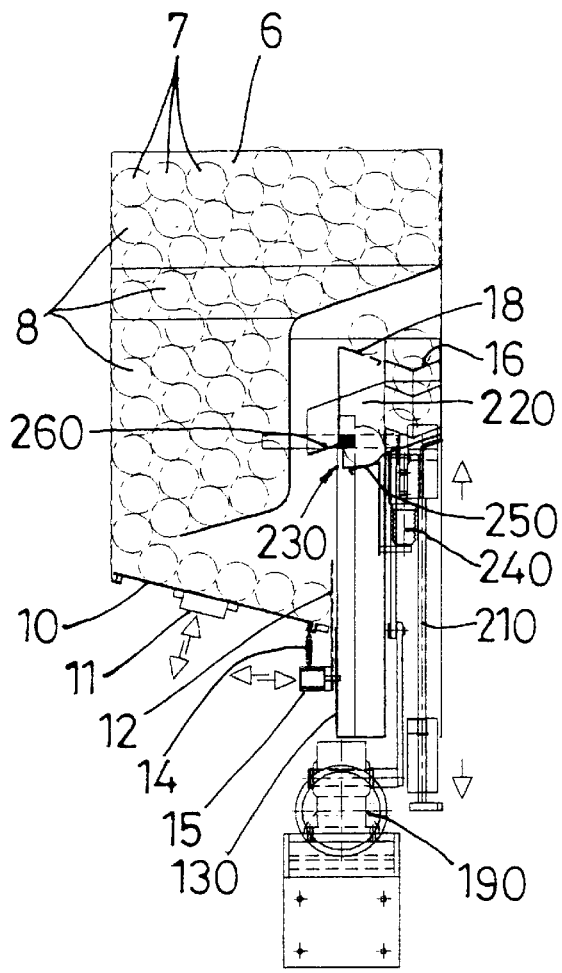
FIG. 2 is a schematic representation of the system supplying the fruits to be squeezed in the functional assembly.
Figure 3:
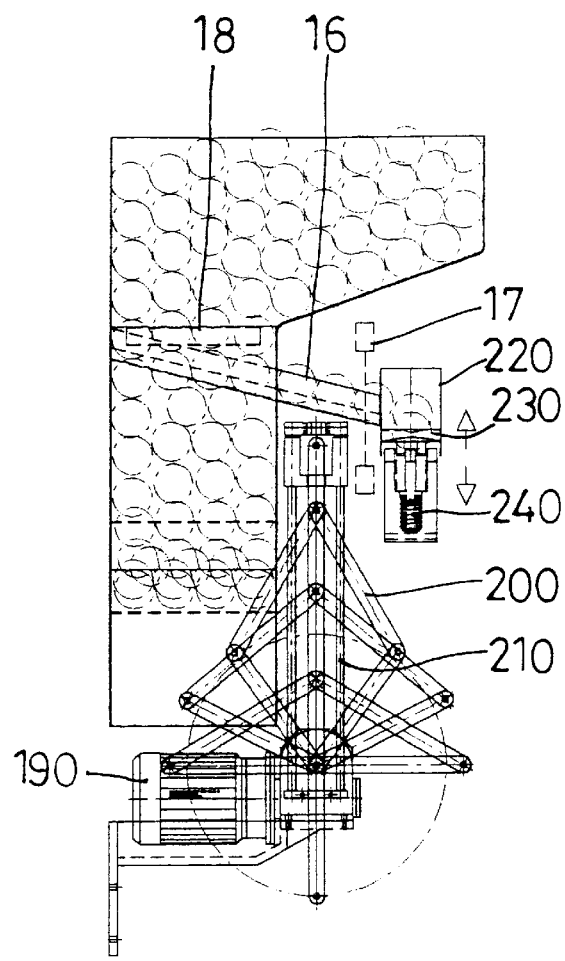
FIG. 3 is a side view of FIG. 2.

Said machine consists of a functional assembly that is enclosed with a frame (1), which can be of any shape and configuration, a self-service application being provided for, without being limitative, such as, for example, in the form represented in FIG. 1, with an outlet (2) supplying glasses (3) with the respective juice, provision being made for a panel (4) for insertion of coins and selection of different types of juices, for example, with sugar, sugar-free, etc. The presence of a transparent window (5) is also provided for, in order to be able to observe the functional squeezing process from outside.

The functional assembly comprises a series of components of partial systems of the functional process, including a supply system, a squeezing system, a residue disposal system and an automatic cleaning system.

The supply system is formed by a hopper (6) that can have a variable capacity, between 10 and 100 kg, for example, where the fruits (7) intended to be squeezed are loaded, which in turn can come in any size, since that does not affect the functional process of the machine.

Said hopper (6) can be freely open on top or come with a closing flap, it being arranged for it to possess at least one transparent sight (8) in front in order to be able to observe the load level.

Said hopper (6) further possesses an inclined plate (10) at the bottom, which can be rocked and vibrated when supported on a vibrator (11), constituting an agitator that makes it possible to move the fruits (7) in order to go out properly to the conveyor (18), so that no spoiled or rotten fruit (7) can remain at the base of the hopper (6).

Figure 4:
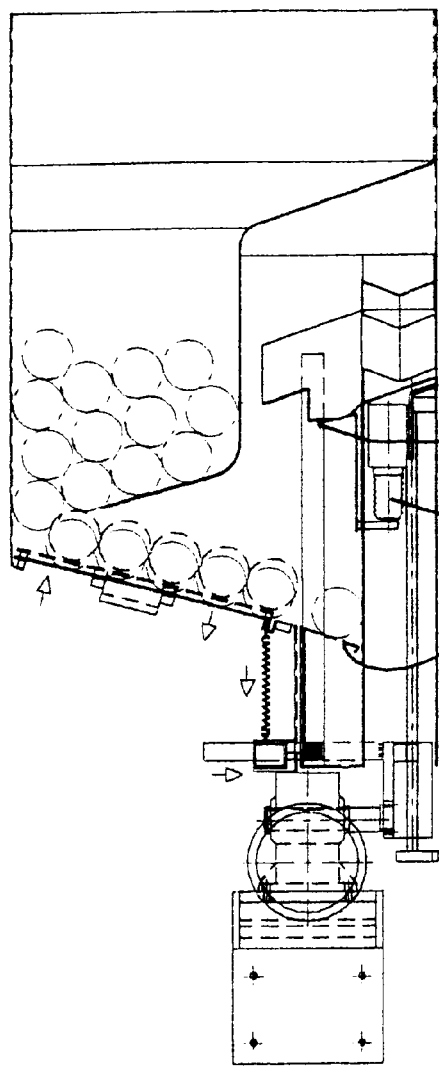
FIGS. 4 and 5 represent a sequence of the process of separation and unit proportioning of the fruits in successive phases.

Said outlet of the hopper (6) incorporates a shear gate (12), which retains the oranges above the base (10). Said gate slides on guides (130) under the action of the spring (14). Combined with this gate (12) is an electromagnet (15). When no fruits (7) are present on the ramp (16) and that is detected by the photocell (17), it gives the order to the electromagnet (15) which, on being activated, projects its shaft to the vibrator (11) and to the ascending conveyor (18), in order to be activated, which causes this conveyor (18) to slide down to the position in the drawing—FIG. 4—at the same time as the vibrator (11) produces vibrations and easy sliding of the fruit (7) on the base (10). On the descent of the conveyor (18), it engages with the shaft of the electromagnet (15), dragging it along to the gate (12), which releases the fruits (7).

At said time, the fruits (7) are deposited on the conveyor (18) and are lifted to the inclined upper ramp (16). All that is produced by the power of the motor (190), which acts by means of the levers (200), at the head of which the conveyor (18) is fastened and which transmit said power upward and downward, using the sliding bars (210) as guides.

The fruit (7), once deposited on the ramp (16), descends to the proportioner (220) under electric-electronic control.

Figure 5:
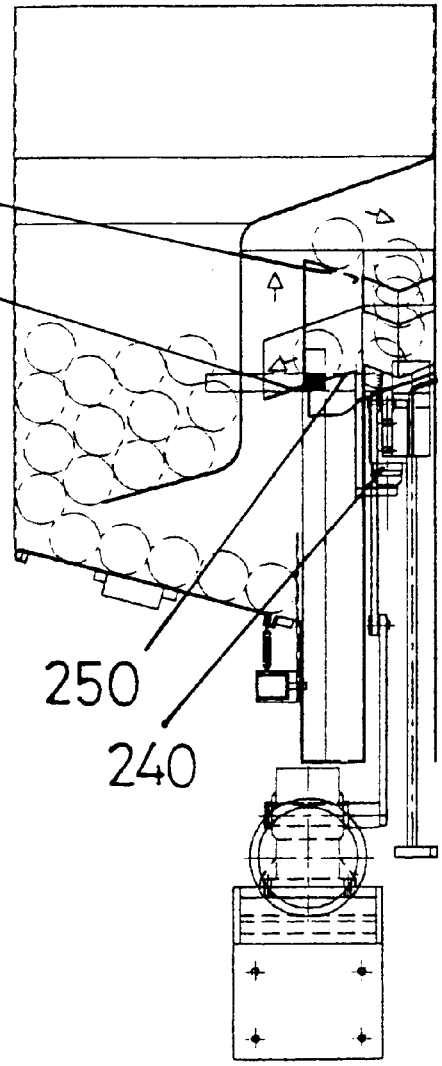
Figure 6:
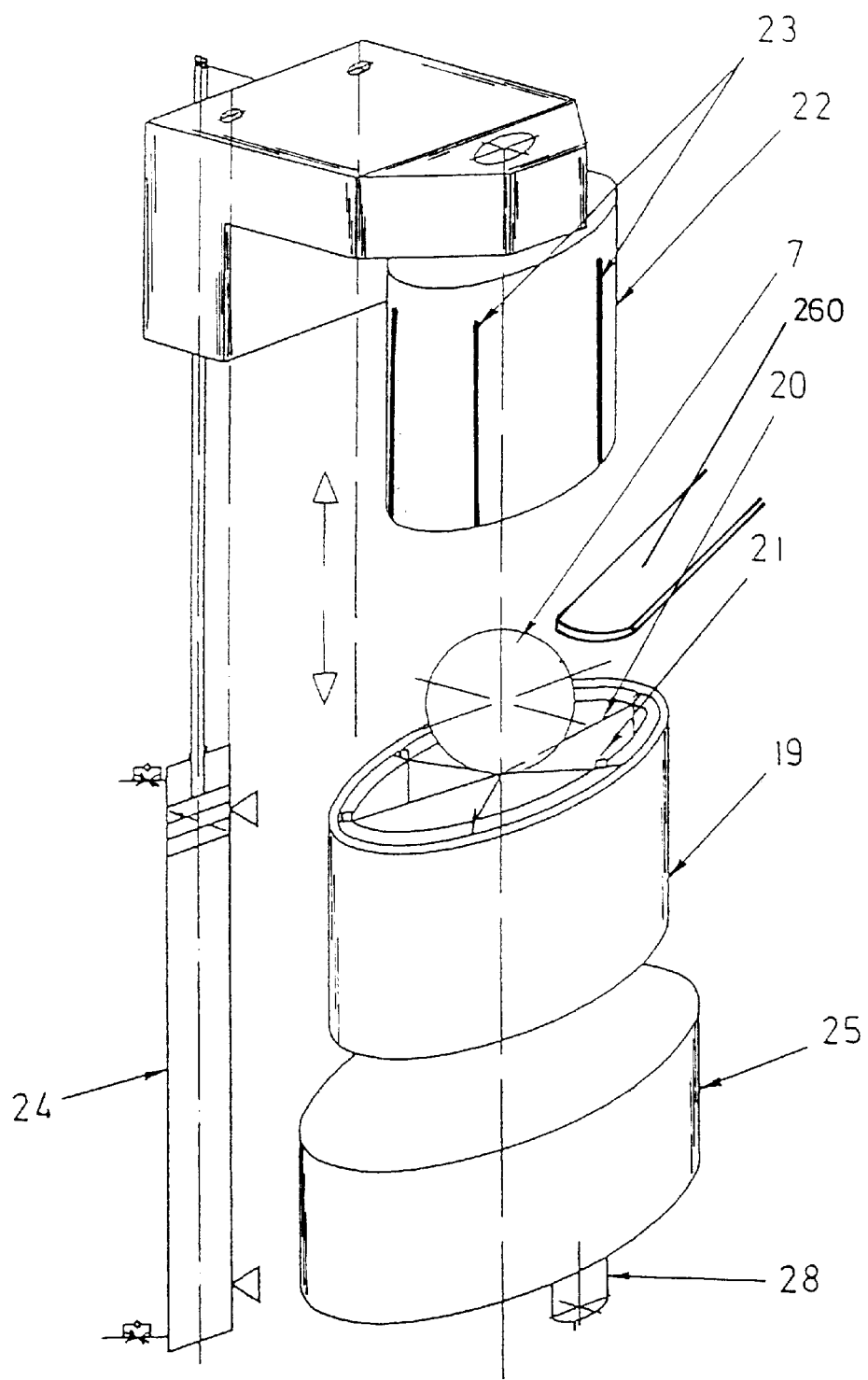
FIG. 6 is a schematic perspective of the functional part corresponding to the squeezer proper.

In said proportioner, the fruit (7) remains held up by the plate (230) until the electronic system of the machine gives the order to the electromagnet (240) to be activated, so that the electromagnet (240) raises the platform (250) that ejects the fruit (7) along the ramp (260)—FIGS. 5 and 6—, making possible the introduction of the fruit (7) in the squeezer and completion of the sequence of proportioning of the fruit (7).

The squeezer mechanism consists of an annular body (19) equipped inside with a series of radial blades (20), protuberances (21) projecting on top in the peripheral portion, which serve as bearings for retaining on the blades (20) the fruit (7) supplied each time from the ramp (260) of the proportioner (220).

A pusher (22) is situated above said body (19), the outside of which matches the inner diameter of the body (19), further possessing some radial grooves (23) that match the blades (20) in position and size. Said pusher (22) is operable in vertical displacement by a drive cylinder (24), in such a way that on descent, it is included inside the body (19), or by any other conventional means like, for example, a motor and a lever system.

Underneath the body (19), a collector (25) is situated in which the squeezer head (26) is axially incorporated, being freely rotating and driven by a motor (27), the collector (25) forming a cavity receiving the juice and the squeezing residues, with a lower outlet (28) for evacuation of the juice, while a conduit (29) emerges on the side, which will pass into a crusher (30).

Figure 7:
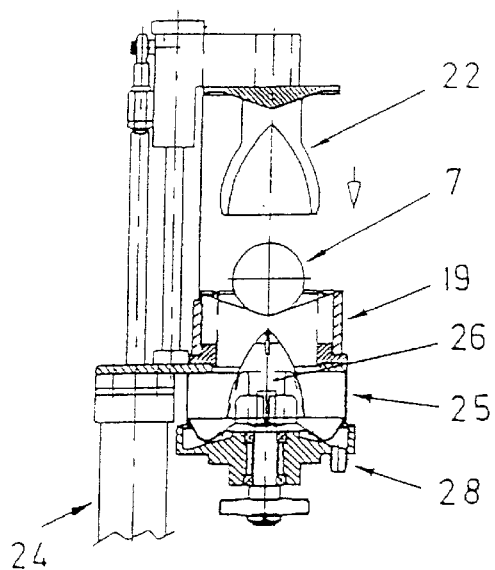
FIGS. 7 to 10 represent a sequence of the functional process of the squeezer, in four successive phases.
Figure 8:
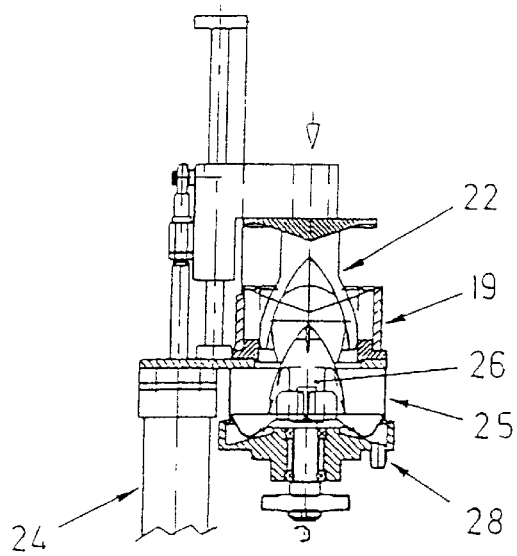

This being the case, when the fruit (7) to be squeezed is situated on the blades (20) of the body (19), as represented in FIG. 7, the pusher (22) drops, forcing the fruit (7) to pass through the blades (20) as represented in FIG. 8, so that the fruit (7) is sectioned into as many chunks as the body (19) possesses blades (20).

Figure 9:
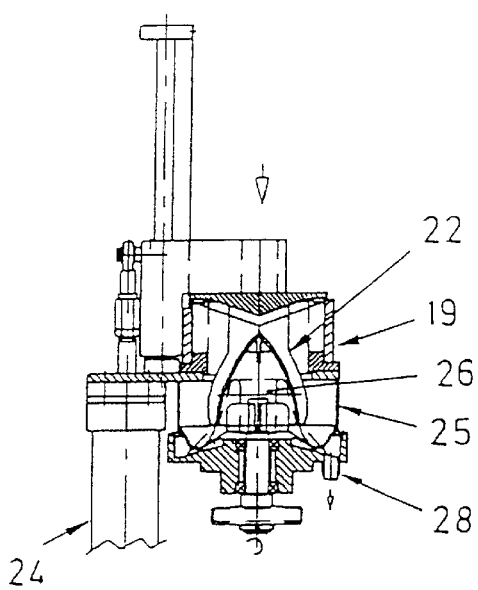

At the same time as said cutting of the fruit (7) takes place, on being pushed downward, the motor (27) goes into operation, making the squeezer head (26) rotate at a slow speed appropriate for squeezing, which causes the pulp from the chunks of fruit (7) to be broken up, the juice being separated and passing through a filtering means in order to drop through the outlet (28), as represented in FIG. 9.

Figure 10:
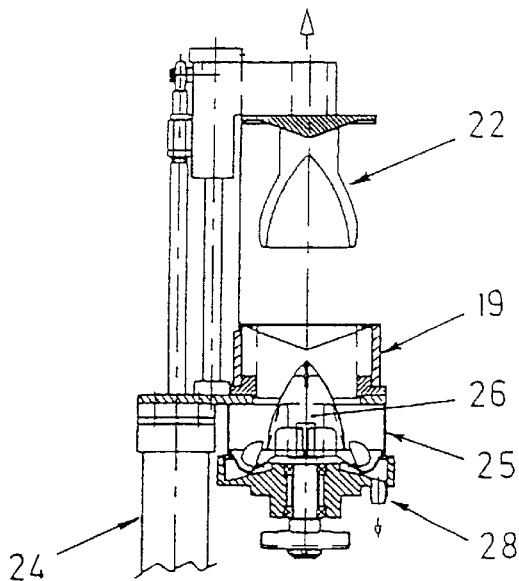
Figure 11:
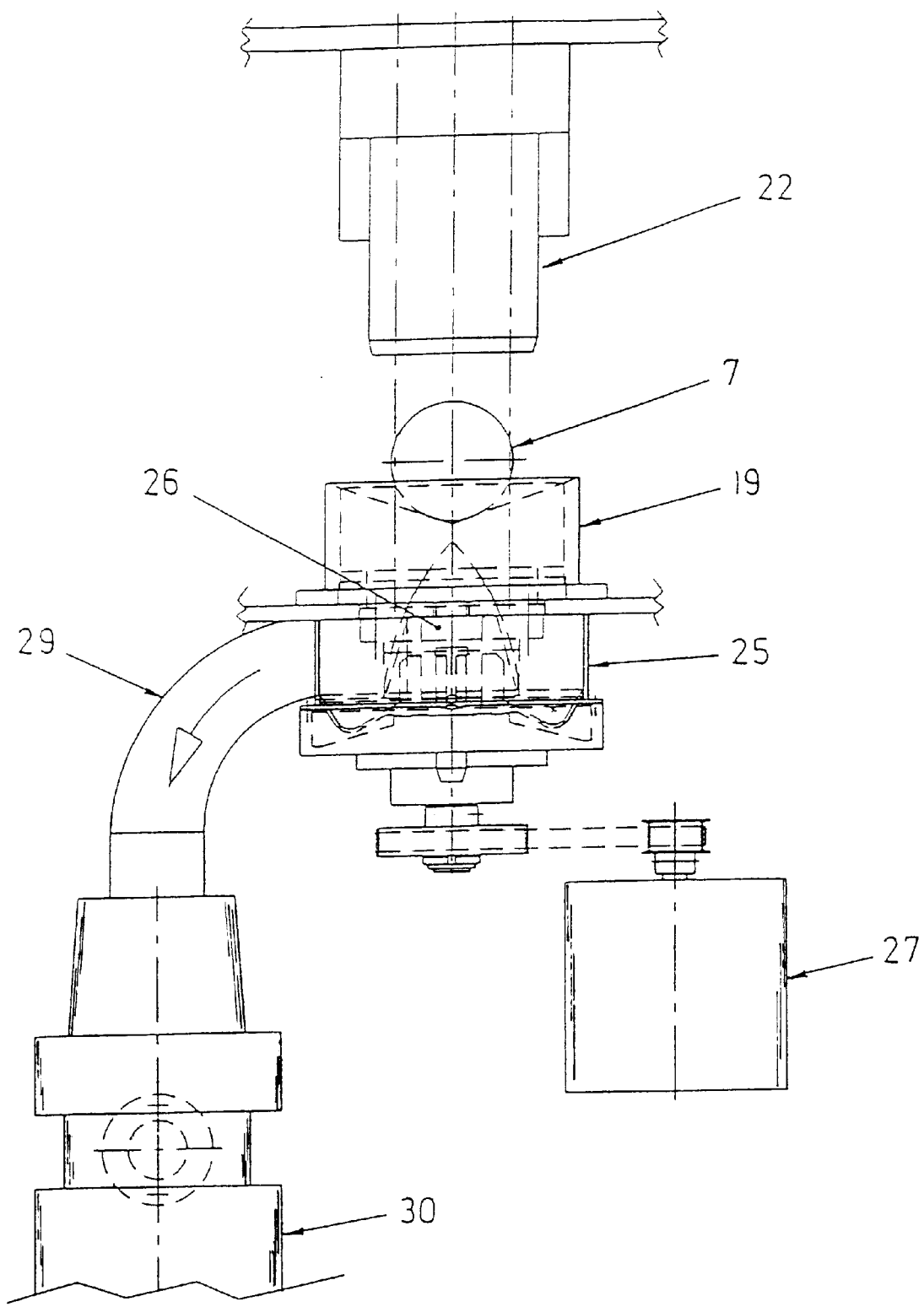
FIG. 11 is a schematic representation of the assembly of squeezer and outlet for expulsion of residues to the crusher.

Once squeezing is carried out, the pusher (22) goes back to the upper position, as represented in FIG. 10, the resulting residues remaining above the filtering means, so that when the motor (27) is then operated at a fast speed, the rotation that the head (26) acquires at such speed causes the said residues to be expelled by centrifugal force, coming out through the side conduit (29) to the crusher (30).

The filtered juice for its part drops through the outlet (28) into a collector (31), from which it is discharged into the dispenser glass (3).

The glass (3) positioned to receive the squeezed juice is situated over a spillage collector (32), which is connected with the crusher (30), so that any possible overflow of juice falling outside the glass (3) will stop in turn at the crusher (30).

In any case, to avoid needless overflow, filling of the glass (3) to the desired level is arranged to be controlled by a photoelectric cell, so that, on reaching the specified level, the squeezing cycles are automatically halted, the supply of fruits (7) through the proportioner (220) being stopped.

The squeezing residues are broken up in the crusher (30), forming a semiliquid mass which passes into a discharge tube (33) in which said mass is introduced by the agitating action produced by the apparatus on operation and by the action of gravity, so that at a given time, a valve (34) situated at the outlet of the crusher (30) blocks passage at the same time as a projection (35) of water and air is injected under pressure into said tube (33), giving rise to the discharge of the residual mass present along said tube (33) to a corresponding evacuation outlet.

The functional assembly of the machine further includes an automatic cleaning system, formed by a pressurized water distribution system (36), which makes possible the projection of water through a series of injectors (37) at given points in the squeezing zone and residue expulsion conduit (29).

This cleaning system goes into operation at the end of the process of preparation of each juice on the established programming, so that, after each functional sequence, the machine is totally free of residue, and all the parts with which the product comes in contact are clean, absolutely hygienic conditions and perfect quality of the juices dispensed thus being achieved, without their being affected in any way by residue or dirt from other previous preparations.

The collector (31) discharging the juice into the dispenser glass (3) is designed with two possible positions, movable, for example, by means of a drive cylinder (38), so that, in the juice production phase, it is situated with the outlet (39) for discharge into the glasses (3), while in the cleaning phase, it is situated with the outlet (40) into an evacuation conduit to the crusher (30), so that the cleaning liquids flow directly to the latter.

The entire functional assembly of said machine is planned to operate automatically, being designed for such purpose with programmable electronic equipment that controls the operation, giving rise to the successive execution of the different operating phases of dispensing of fruits (7), squeezing and cleaning, according to the programming established, without the need at any time for an operator's intervention, which is only required in order to load the hopper (6) with the fruits (7) to be squeezed.

The machine can therefore be installed with the system (36) connected to a water tap and, as the case may be, with the discharge tube (33) connected to a drainage system. But, at the same time, without that altering the concept or operation of the machine assembly, the system (36) can be supplied by means of an impeller pump (41) from a water tank (42) situated inside the frame itself (1); and in the same frame (1), a residue collector (43) can likewise be included, into which the tube (33) passes, so that the machine will be capable of independent operation and can be directly installed anywhere without the need for special fittings, even if no water tap nor drainage outlet should exist.

The functional assembly of the machine is further designed to be included inside a frame (1) in a refrigerated environment, which facilitates preservation of the fruits (7) in the hopper (6), at the same time as the juices dispensed come out fresh, in fit condition for direct consumption, without having to be cooled by other means.

Figure 12:
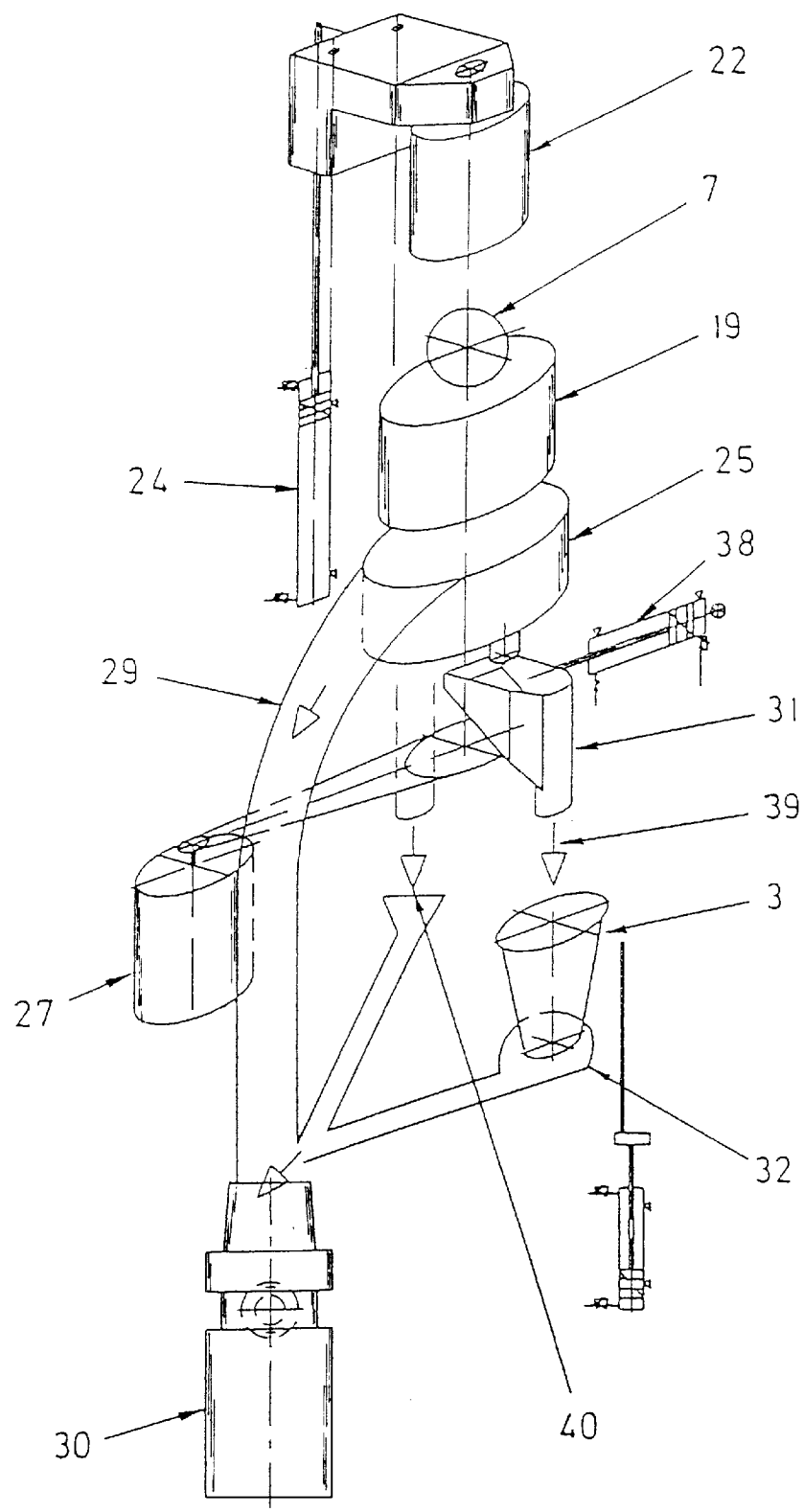
FIG. 12 is a general schematic perspective of the squeezer, with the residue expulsion outlet and juice line to the dispenser glass.
Figure 13:
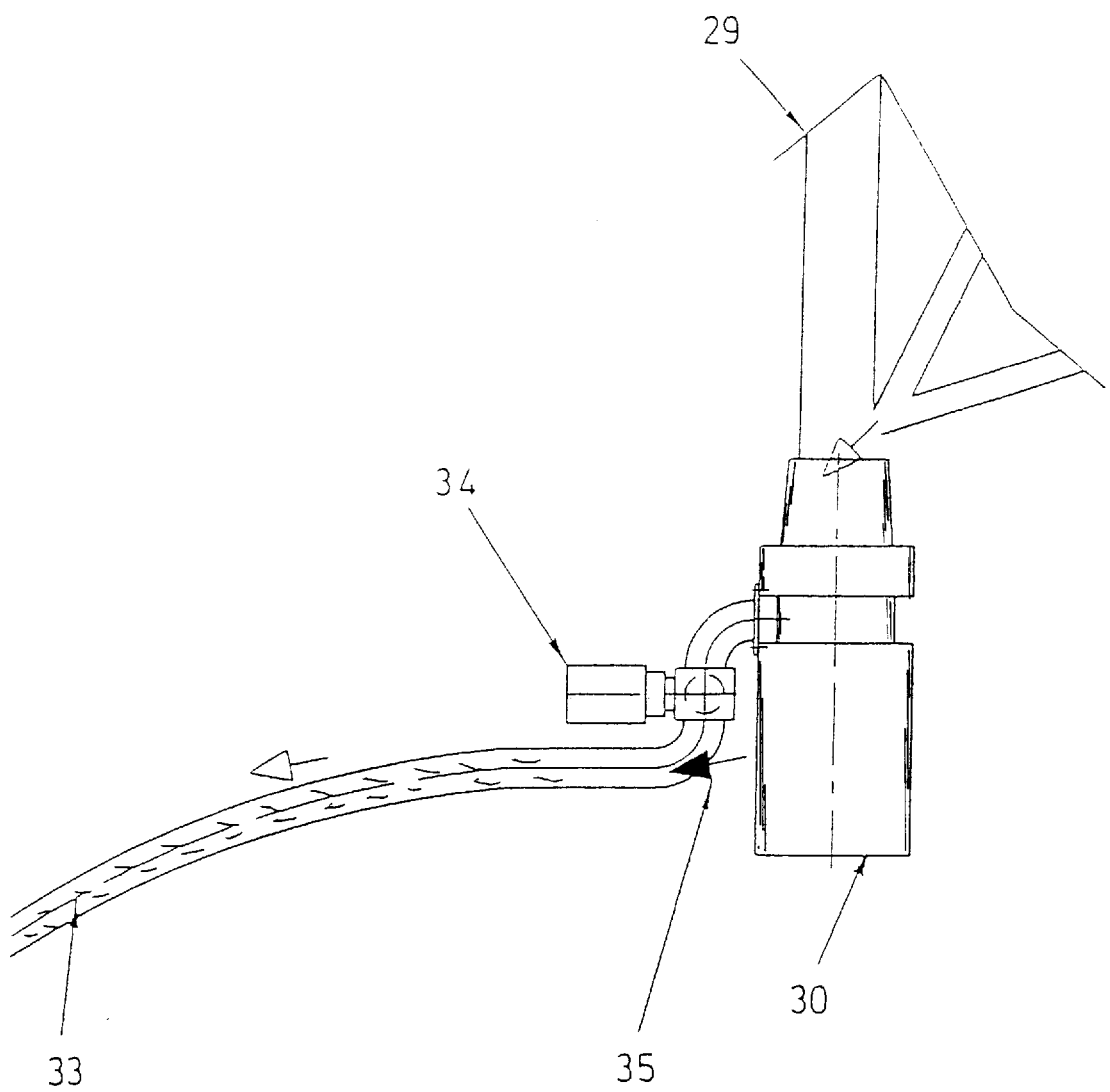
FIG. 13 is a diagram of the residue disposal system.
Figure 14:
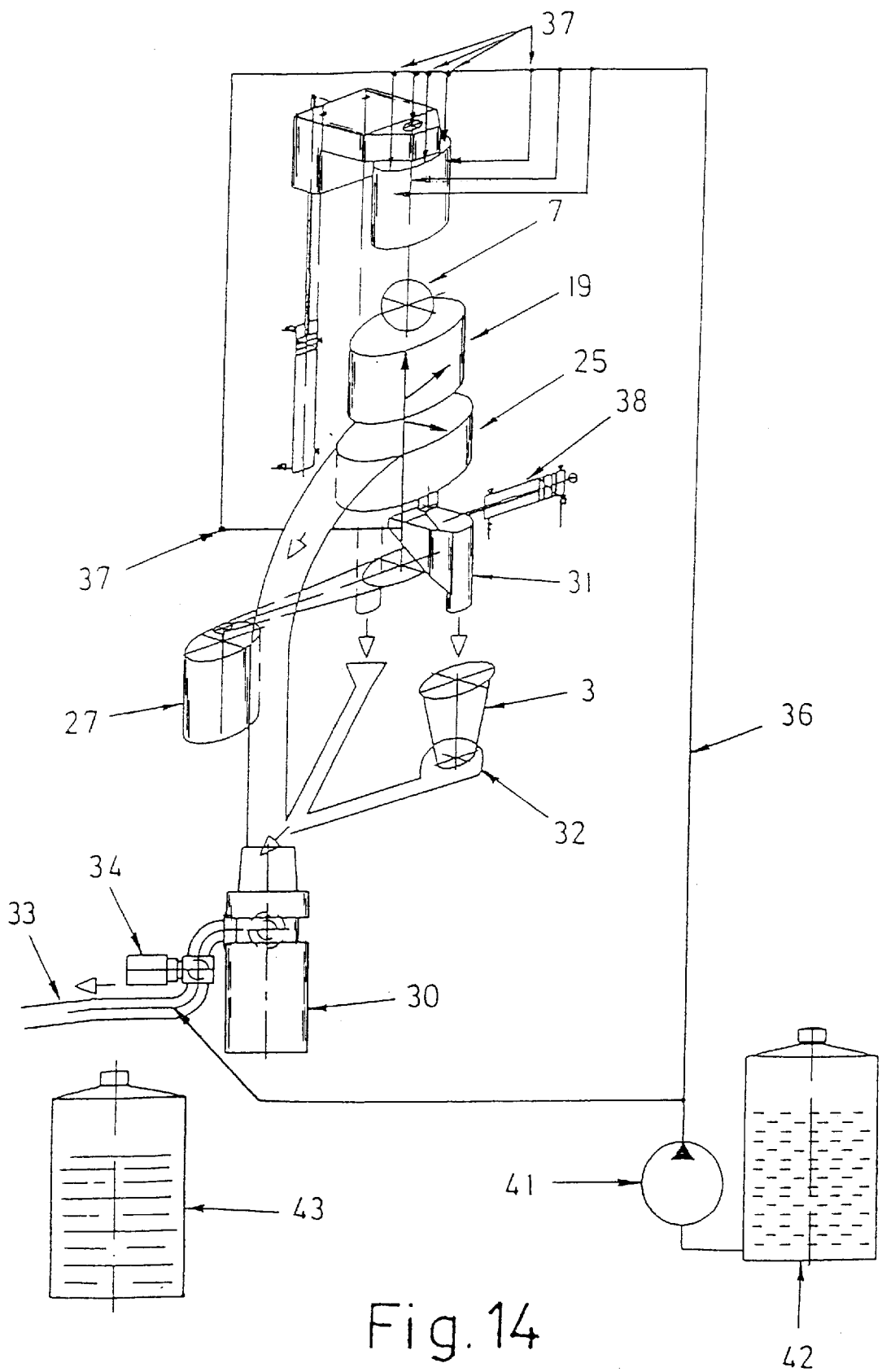
FIG. 14 is a schematic representation of the functional assembly with the automatic cleaning system.

In FIG. 12, instead of a drive cylinder (38) creating the rotary motion of the collector (31), it can be arranged for said collector (31) to be stationary, but with two conduits that will pass out to the glass (3) or to the crusher (30) respectively, means being available, such as an electromagnet, to block or open/close one of the conduits.

What is claimed is:

1. An automatic machine for dispensing natural fruit juices from fruit comprising:
   a housing;
   a supplier for holding and proportioning said fruit mounted in said housing;
   a squeezer for cutting and squeezing said fruit to obtain natural fruit juices mounted in said housing, said squeezer receiving said fruit from said supplier and dispensing said natural fruit juices;
   a residue disposer for crushing and expelling residue of said fruit after said natural juices have been obtained, said disposer mounted on said housing; and
   an automatic cleaner for distributing water to said squeezer and said disposer, said cleaner mounted in said housing.

2. The machine of claim 1 wherein said supplier comprises:
   a hopper for holding fruit, said hopper having an inclined bottom plate, a vibrator attached to said inclined bottom plate for moving fruit to an outlet of said hopper, and a shear gate controlled by an electromagnet and positioned at said outlet of said hopper;
   an ascender/descender conveyor for moving fruit from said shear gate to an inclined upper ramp; and
   a proportioner which receives fruit from said inclined ramp and proportions said fruit to said squeezer.

3. The machine of claim 1 wherein said squeezer comprises:
   an annular body having radial blades therein for cutting the fruit;
   a pusher vertically displaceably situated above said blades for pushing fruit onto said blades;
   a rotatable squeezer head positioned in a collector below said blades and driven by a two-speed motor which rotates at the same time fruit is pushed down by said pusher onto said blades.

4. The machine of claim 3 wherein said collector has a residue outlet connected to a conduit through which said residue is expelled from said collector by centrifugal force from said squeezer head.

5. The machine of claim 1 wherein said residue disposer comprises:
   a conduit connected to said squeezer and through which said residue is expelled from said squeezer;
   a crusher connected to said conduit for crushing said residue, said crusher having an outlet for crushed residue;
   a check valve connected to said outlet of said crusher;
   an expulsion outlet connected to said check valve and a pressurized water and air projector connected to said expulsion outlet for conveying the residue out said expulsion outlet.

6. The machine of claim 1 wherein said cleaner is connected to an outside water tap, or is connected to an independent tank and a pump, said tank and said pump positioned in said housing.

7. The machine of claim 5 wherein said expulsion outlet is connected to an outside drainage system, or is connected to a residue collector which is positioned in said housing.

8. The machine of claim 1 wherein said housing is an enclosed frame which refrigerates the interior of said housing so as to provide flavor preservation of the fruit and permit dispensing of cold juices.

9. An automatic machine for dispensing natural fruit juices from fruit comprising:
   an enclosed refrigerated frame;
   a supplier of fruit mounted in said frame, said supplier having a hopper for holding fruit, said hopper having an inclined bottom plate, a vibrator attached to said inclined bottom plate for moving fruit to an outlet of said hopper, and a shear gate controlled by an electromagnet and positioned at said outlet of said hopper, an ascender/descender conveyor for moving fruit from said shear gate to an inclined upper ramp;
   a proportioner which receives fruit from said inclined ramp and proportions said fruit to a squeezer;
   said squeezer comprising an annular body with radial blades therein for cutting the fruit, a pusher vertically displaceably situated above said blades for pushing fruit onto said blades, and a rotatable squeezer head positioned in a collector below said blades and driven by a two-speed motor which rotates at the same time fruit is pushed down by said pusher onto said blades, thereby generating natural fruit juice and fruit residue;
   a residue disposer having a conduit connected to said squeezer and through which said residue is expelled from said squeezer, a crusher connected to said conduit for crushing said residue, said crusher having an outlet for crushed residue, a check valve connected to said outlet of said crusher, an expulsion outlet connected to said check valve, and a pressurized water and air projector connected to said expulsion outlet for expelling said residue;
   a cleaner for distributing water to said squeezer and said residue disposer for cleaning thereof; and
   said squeezer having an outlet through which said natural juice is dispensed.

10. The machine of claim 9 wherein the cleaner is connected to an outside water tap, or is connected to an independent tank and a pump, said tank and said pump positioned in said housing.

11. The machine of claim 9 wherein said expulsion outlet is connected to an outside drainage system, or is connected to a residue collector which is positioned in said housing.

* * * * *